United States Patent [19]

O'Neill

[11] 4,163,426
[45] Aug. 7, 1979

[54] HIGHWAY SAFETY DEVICE

[76] Inventor: Donald C. O'Neill, P.O. Box 4092, Manchester, N.H. 03108

[21] Appl. No.: 889,871

[22] Filed: Mar. 23, 1978

[51] Int. Cl.² ............................ B60Q 1/32; G09F 7/00
[52] U.S. Cl. ........................................ 116/28 R; 40/591
[58] Field of Search ................. 116/28 R, 173, 63 P; 40/591, 608, 610

[56] References Cited

U.S. PATENT DOCUMENTS

| | | | |
|---|---|---|---|
| 2,638,583 | 5/1953 | Edwards, Jr. | 116/63 P |
| 3,255,725 | 6/1966 | Von Kreidner et al. | 116/173 |
| 3,305,961 | 2/1967 | Lanzon et al. | 40/591 |
| 3,490,749 | 1/1970 | Anderson | 116/63 P X |
| 3,622,980 | 11/1971 | Elledge, Jr. | 40/591 X |
| 3,715,821 | 2/1973 | Hawes | 116/173 X |
| 3,738,309 | 6/1973 | Nicholl | 116/63 P |
| 3,791,337 | 2/1974 | Schamblin | 40/591 |
| 3,975,849 | 8/1976 | Tuleja | 40/591 X |

*Primary Examiner*—Daniel M. Yasich

[57] ABSTRACT

The invention relates to a highway safety device and in particular to a device which is constructed and arranged to be removably mounted on the window glass of an automobile such that it extends laterally from the automobile so that it may be readily seen by passing motorists. Briefly, the present device comprises a mounting base and a pole extended from the base. A light is mounted on the end of the pole and a fluorescent flag mounted beneath the light whereby passing motorists may easily see that the motorist is in distress and come to his aid.

2 Claims, 4 Drawing Figures

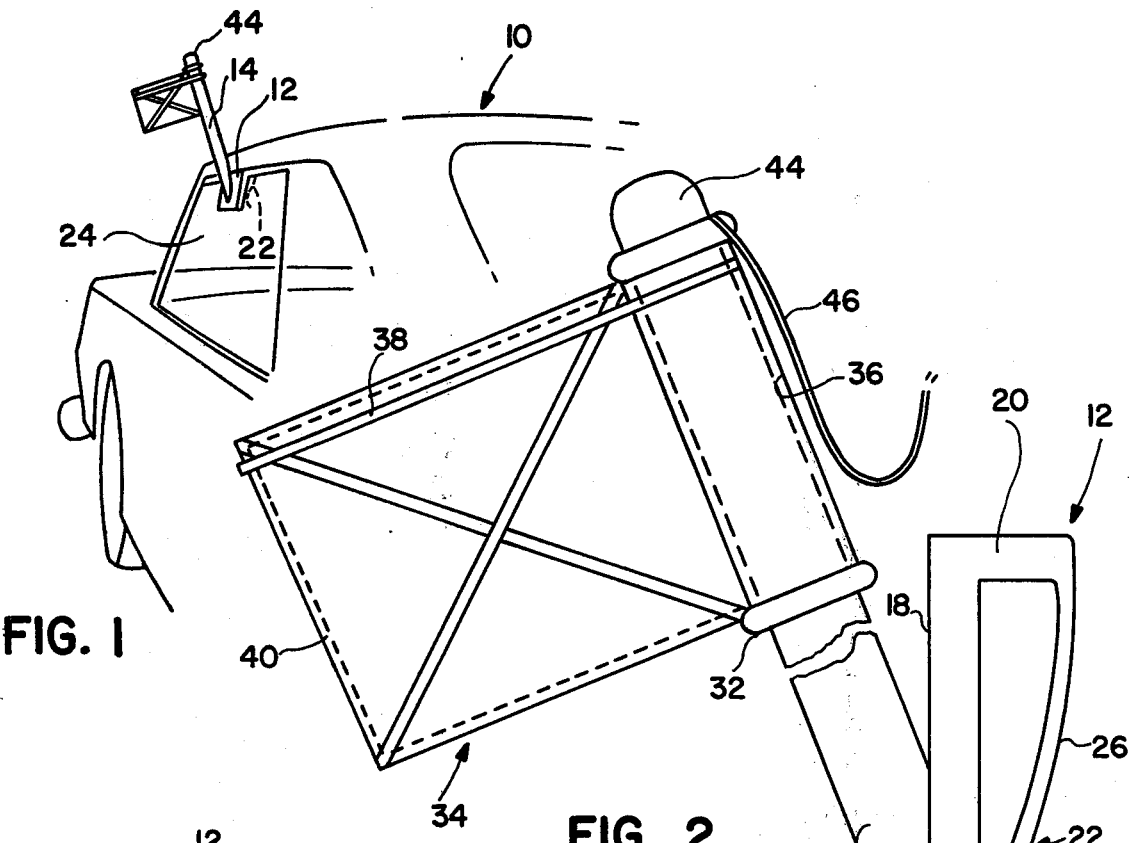
FIG. 1
FIG. 2
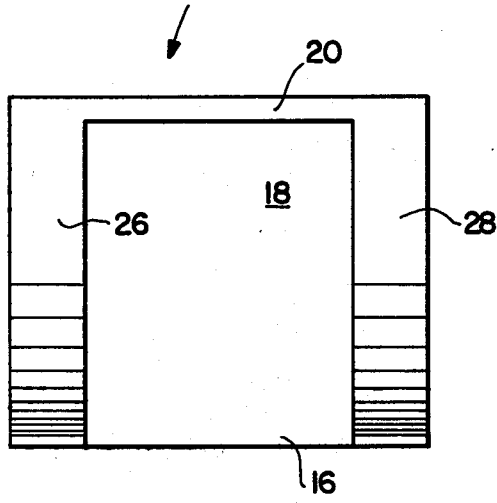
FIG. 3
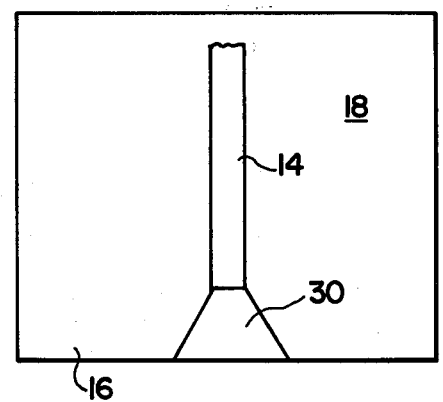
FIG. 4

HIGHWAY SAFETY DEVICE

BACKGROUND OF THE INVENTION

The invention resides in the field of safety devices for use by motorists in distress on the highways to signal for assistance while remaining safely within their automobile.

DESCRIPTION OF THE PRIOR ART

Prior to the present invention there have been many safety devices for use by motorists traveling on the highways such as flares, flags and other signals. Most of the devices of which I am aware must be set on the ground outside of the automobile or held by the motorist personally. One of the most common signals used is a rag or towel tied or hung from the automobile radio antenna. At times the hood of the care is raised as a signal for help.

In contrast to all of the prior art signal devices the present invention contemplates a novel and improved detachable device which may rapidly and efficiently be attached to the window of the car and extend laterally therefrom to provide an effective distress signal.

FIELD OF THE INVENTION

The present invention has for a principal object to provide a novel and improved highway safety device which is characterized by structure whereby it may be rapidly and efficiently detachably mounted to extend from the window of an automobile.

Another object of the present invention is to provide a highway safety device which may be easily seen by passing motorists when put in use whether it is daytime or nighttime.

A further object of the invention is to provide a safety device which is of relatively simple structure and economical to manufacture and sell.

A still further object is to provide a highly effective highway safety device which is readily mountable on substantially all models and makes of automobile both foreign and domestic.

Another object of the invention is to provide a highway safety device which, when mounted in operative position relative to the vehicle in distress, may be seen from a substantial distance by a passing motorist.

With these general objects in view and such others as may hereinafter appear, the invention consists in the present highway safety device and in the structure and arrangement of the parts thereof as hereinafter illustrated and described in the description and drawings hereof.

In the drawings illustrating the preferred embodiment of the invention:

FIG. 1 is a perspective view of the device mounted on the side of the window of a motor vehicle;

FIG. 2 is an enlarged side elevation of the present device;

FIG. 3 is an elevation from the back of the base of the device, and

FIG. 4 is a front view of the device with the flag pole partially broken away.

SUMMARY OF THE INVENTION

Referring now to the drawings illustrating the preferred embodiment of the invention FIG. 1 in particular, illustrates the present safety device operatively mounted on the raised side window of a motor vehicle 10. As therein shown the present device embodies a base member 12 having an integral pole 14 extending laterally and upwardly from the lower portion 16 of the base member 12. The base member 12 consists of a front section 18 a rather short laterally extended spacer portion 20 and a curved downwardly extended spring clip portion 22. The front section 18, spacer 20 and clip portion define a space for receiving the window glass of the car door window. The spring clip 22 is arranged to engage and grip the inside of the window glass 24 and support the pole 14 at an angle of preferably 70° relative to the horizontal surface of the road. The pole 14 thereby extends outwardly and upwardly from the car window.

FIG. 2 illustrates in more detail the relation of the front section, spacer and clip as well as the angular disposition of the pole relative to the base member.

As shown best in FIG. 3 the spring clip 22 comprises a pair of legs 26,28 and as illustrated in FIG. 4 the pole 14 is preferably ⅜" in diameter and has a wide supporting base section 30.

The pole 14 is preferably 10" in length and is provided with a flange or lip 32 approximately 6" from the base. The flag 34 is provided with a pocket 36 into which the pole is slipped. The flag is held snugly on the pole and supported in the lip 32 as shown. A stiffener 38 is attached to the flag to retain it in its extended position so that it will be easily seen when the device is in operative position on the car window.

The edges of the flag 34 are provided with stiffening seams 40 and crossed strips of material of a color different from that of the flag itself. The flag is also provided with holes 42.

An electric flasher light 44 is mounted at the top of the pole 14 and is arranged to be connected to a source of electrical current through the cigarette lighter socket in the automobile. The wires 46 having a conventional plug adapted to be plugged into the cigarette lighter socket.

In operation whenever the automobile breaks down on the highway or has another emergency, the operator merely lowers the side window and slips the clip 22 over the upper edge of the glass. The device is then in operative position. The window is then rolled up and the plug, not shown, is inserted into the cigarette lighter. If it is nighttime, the flasher may be turned on and seen for a great distance and help summoned. If it is in the daytime, the fluorescent flag will signal for help.

From the foregoing description of the present invention it will be apparent that the present safety device provides an economical signal structure which is relatively inexpensive and highly efficient in use. It has a particular advantage in that the driver of the vehicle may place the device in operative position and remain safe within the vehicle until help arrives.

While the present device has been thus illustrated and described it will be understood that it may be embodied in different forms without departing from the present invention.

Having thus described the invention what is claimed is:

1. A highway safety device for use in signaling for assistance in the event of a breakdown on the highway comprising: a unit adapted to be supported on the raised side window glass of a motor vehicle, said unit having a front section, a spacer section and a spaced pair of resilient legs extending downwardly from the spacer section, prior to engagement with the window said legs having their lower ends in engagement with one side of the front section, a pole extending outwardly and upwardly from the lower portion of the other side of the front section, said unit being mounted on the car window with the front section pressed against one surface of the window and the pair of legs in spring pressed engagement with the other side of the window, the spacer being in engagement with the top edge of the window, said pole having a luminous flag movably mounted within the pole and a light on the top for signaling passing vehicles, said flag provided with diagonally extended stiffening seams and a laterally extended stiffening member for holding the flag in an outwardly extended position to the pole.

2. A highway safety device as defined in claim 1, wherein each of the spaced legs is similarly curved, the lower ends of each leg being curved outwardly to facilitate engagement of the unit on to the window prior to the raising of the window.

* * * * *